Aug. 2, 1955 W. HORTH 2,714,237
APPARATUS FOR RECLAIMING GRANULAR MATERIAL
Filed Feb. 1, 1950 3 Sheets-Sheet 2
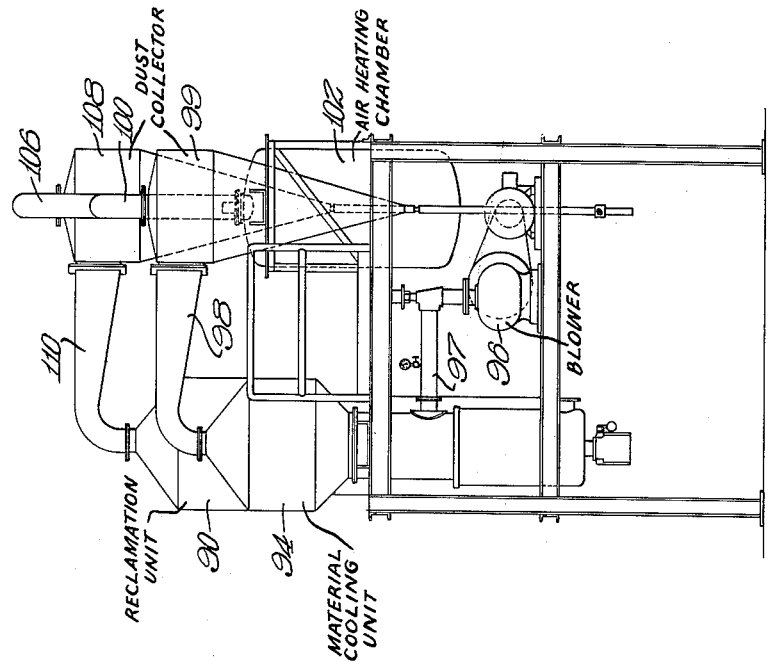
Inventor
Walter Horth
By [signature] Attys

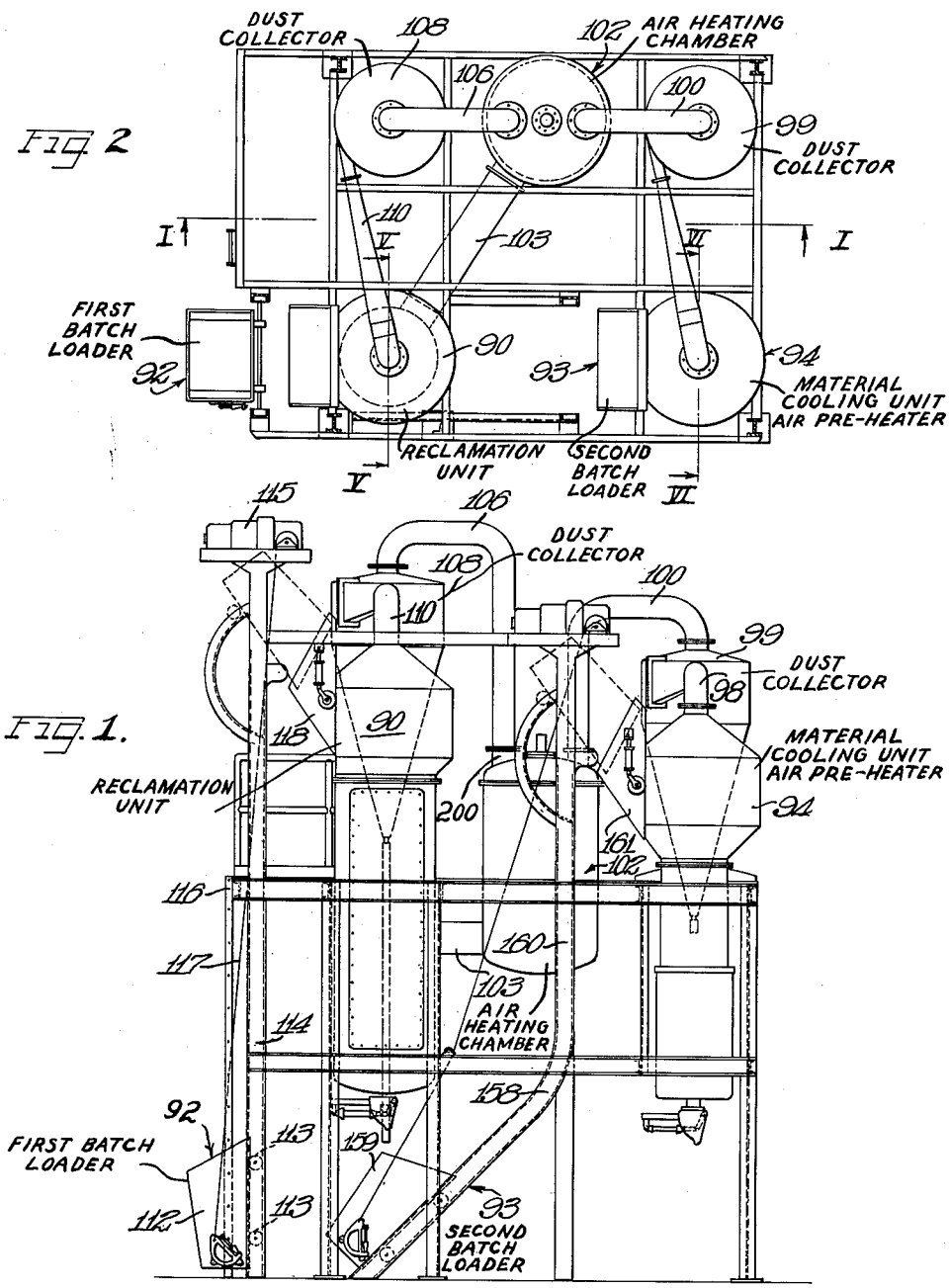

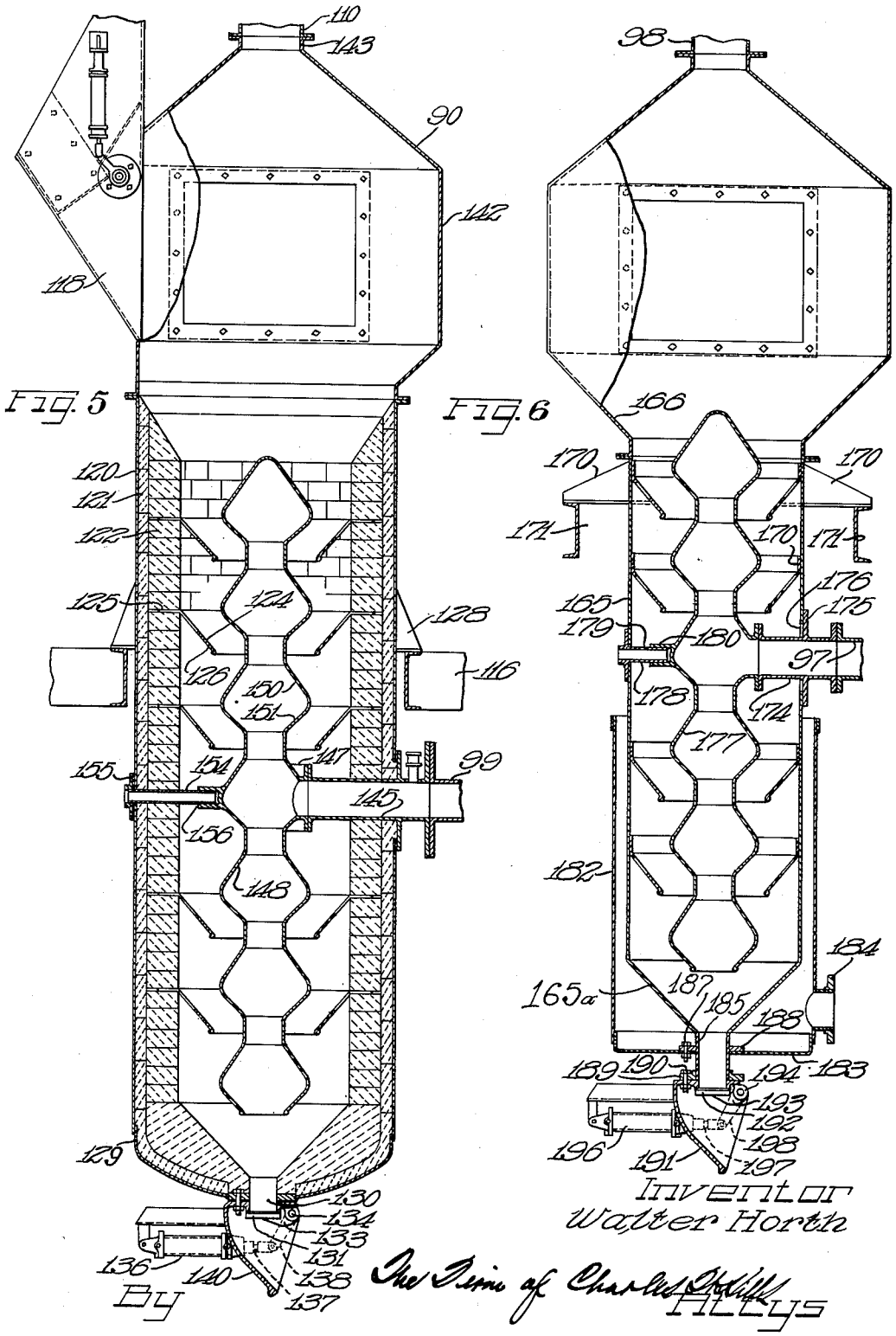

United States Patent Office 2,714,237
Patented Aug. 2, 1955

2,714,237

APPARATUS FOR RECLAIMING GRANULAR MATERIAL

Walter Horth, Wilmette, Ill., assignor, by mesne assignments, to Herbert Simpson Corporation, Chicago, Ill., a corporation of Illinois Application February 1, 1950, Serial No. 141,741

1 Claim. (Cl. 22—89)

This invention relates to improvements in apparatus for reclaiming granular material. More particularly it has to do with a novel apparatus for reclaiming sand by blowing heated air therethrough under controlled temperature, pressure and velocity conditions.

In foundry work sand is used in making molds. During the preparation of this sand, oil, cereal binders, wood flour, pitch, sea-coal and other hydrocarbons are added to the sand to give it certain desirable molding characteristics. After the casting operation is completed, some of this material will remain in the sand as carbonaceous deposits which must be removed during the reclaiming process.

Various types of apparatus have been used with some success for removing these deposits and other foreign accumulations from the sand particles. The usual process is to apply heat to the sand to burn off the carbonaceous deposits.

It is an important object of this invention to provide a novel, more efficient apparatus for removing carbonaceous deposits from used foundry sand.

A still further object of this invention is to provide improved means for removing dusty, non-combustible materials from sand by a novel scrubbing action.

A still further object of this invention is to provide apparatus for simultaneously cooling the batch of sand that has been processed and preheating air for subsequent circulation through the reclamation chamber.

According to the invention, sand to be treated is delivered into the reclamation chamber where the air currents pick up the sand and lift it toward the top of the chamber and then permit it to cascade downwardly over a plurality of baffles disposed in the chamber to the bottom thereof where it is picked up again by the air currents and moved to the top of the chamber. During this repeated turbulent movement of the sand, the following operations are carried out:

1. Carbonaceous materials, such as vegetable and mineral oils, cereal binders and other hydrocarbons, are burned off of the sand grains.
2. Non-combustible liquids, such as water, are vaporized.
3. Non-combustible solids, such as clay, bentonite and silica flour, are scrubbed from the sand grains.
4. Sand conglomerates, such as lumps, are broken down into individual sand grains.

After the sand is processed, it is dumped into a cooler where it is cooled by direct contact with the air which is subsequently used in the combustion process.

Other and further important features, objects and advantages of the present invention will be apparent to those skilled in the art from the following detail description of the annexed sheets of drawings.

On the drawings:

Figure 1 is a front elevational view of one embodiment of the reclamation unit of this invention;

Figure 2 is a top plan view of the unit of Figure 1;

Figure 3 is a vertical sectional view taken on line III—III of Figure 2;

Figure 4 is an end elevational view of the unit of Figure 1;

Figure 5 is a vertical sectional view taken on line V—V of Figure 2; and

Figure 6 is a vertical sectional view taken on line VI—VI of Figure 2.

As shown on the drawings:

Referring to Figures 1 through 6, a reclamation unit 90 is supplied with batches of sand by a bucket type batch loader 92. After the sand has been reclaimed, it is deposited in a second batch loader 93 which takes the sand to the top of a cooling unit 94 and deposits it therein for cooling. After the sand has been cooled it is discharged through a discharge gate at the lower end thereof. Air is directed from a blower 96 through a pipe 97 to the cooling chamber 94. The air is heated in the cooling chamber 94 and it leaves in a pre-heated state through an overhead conduit 98 directed to a cyclone type dust collector 99. After dust particles have been separated out in the dust collector 99, the air is directed through a conduit 100 to an air heating chamber 102. After the air is heated in this chamber 102 it is directed through a conduit 103 to the reclamation unit 90. The heating unit 102 also has a conduit 106 leading to a cyclone type dust collector 108 which is also connected through a conduit 110 to the top of the reclamation unit 90.

The bucket loader 92 has a bucket 112 mounted on wheels 113 for movement in a vertical direction in a track 114. A motor 115 mounted on the upper end of the support structure 116 drives pulley wheels carrying cables 117 that lift the bucket in the track and dump it into a chute 118 on the side of the reclamation unit 90.

The reclamation unit 90 is shown in detail in Figure 5. This unit comprises an outer cylindrical shell 120 which is lined with insulating refractory 121 and refractory brick 122. At regularly spaced intervals alloy steel baffles 124 extend across the reaction chamber defined by the firebrick wall. The baffles 124 have ring-like flanges 125 cemented between adjacent firebricks to support the baffles therein and also have a central segmental conical portion 126 on which sand is directed downwardly and inwardly in the reclamation unit. Angle support brackets 128 secured to the outer casing of said unit support it from the frame structure 116.

The unit 90 has a lower rounded end portion 129 which may be formed integrally with the wall 120 and may be provided with a discharge nozzle 130 with which is associated a discharge door 131. The discharge door 131 is secured to one end of a lever 133 which is pivotally mounted at the other end on a pivot pin 134. A power cylinder 136 has a piston rod 137 connected to a lever 138 which is also secured to the pivot rod 134. Thus, actuation of the power cylinder 136 will open and close the door 131 and permit sand in the reclamation unit to be discharged through the nozzle 130 and be guided by a guide structure 140 into a suitable receptacle. The power cylinder 136 may, of course, be arranged for remote control either manually or in an automatic control system.

At the upper end of the unit 90 there is disposed an enlarged hood portion 142 which provides an expansion chamber for exhaust gases coming from the reaction chamber in order to reduce the amount of fines carried away with the gases. At the top of the expansion chamber there is a nozzle portion 143 which is arranged to be connected to the conduit 110 which leads to the dust collector 108.

Air is introduced into the reclamation unit by a tubular member 145 which extends through a suitable opening in the wall. This tube has a flange connection with the conduit 103 which leads from the air heater 102. At its inner end the tube 145 is connected to a flange 147 of a vertically disposed air supply tube 148. This tube extends longitudinally in the reaction unit and has a plurality of connected outwardly sloping walls 150 and inwardly sloping walls 151, the outer surfaces of which define segmental conical baffle surfaces which cooperate with the baffle surfaces 126 for directing the sand downwardly in the reaction chamber in a wavy or serpentine path. A support rod 154 extends through the wall of the unit and is secured in a flange plate 155 on the exterior of the wall and has its inner end disposed in an opening 156 in a lateral extension of the air supply tube. This support arm helps to support the air supply tube in place in the reclamation chamber.

The bucket loader 93 is similar in construction to the bucket loader 92 with the exception that it has a curved track portion 158 which guides the bucket 159 upwardly into the vertical section 160 of the track. The bucket is arranged to dump material into an adapter chute 161 of the cooler 94.

The cooler unit 94 is shown in detail on Figure 6 and comprises an outer cylindrical casing 165 which has a segmental conical guide chute 165a at the lower end and a flanged top which is arranged to be connected to the flanged lower opening of an expansion chamber 166 disposed thereabove. The expansion chamber has a flange connection to a discharge conduit 98 leading to the dust collector 99.

Brackets 170 secured to the outer casing 165 support the unit from structural members 171 of the frame structure 116 of the unit.

The cooler 94 has a plurality of regularly spaced segmental conical baffles which have inwardly and downwardly sloping surfaces and have ring-like flanges 170 secured as by welding to the inner wall of the casing. Air is introduced to the cooler 94 by means of a tubular member 174 which has a flange 175 secured over an opening 176 in the wall of the unit. At one end the tubular member 174 has a flange connection to the conduit 97 leading from the blower 96 and at the other end has a flange connection to a vertically disposed air supply tube 177. This tube 177 is identical in design to the tube 148 of Figure 5 having sloping walls which cooperate with the outer baffles to define a serpentine path for the sand as it moves downwardly in the cooling unit. The lower end of the air inlet tube is open for directing air into the bottom of the unit. A support arm 178 extends through the wall of the unit and has one arm connected in an opening 179 in extension 180 of the air supply tube.

In order to further cool the sand being discharged from the cooler there is provided a cooling jacket 182 which extends around the lower half of the cooling chamber. This jacket is closed at the bottom by a closure plate 183 suitably secured thereto, as by welding. Air may be supplied to the inside of the jacket through a nozzle connection 184. It is evident of course that a cooling coil in which cold water is circulated could be disposed in said cooling jacket for the cooling of the sand therein.

Sand is discharged from the cooling unit 94 through a nozzle 185 extending through the wall of the plate 183 and suitably secured at the plate by a bolt 187 to a flange 188 of the nozzle. At its lower end the nozzle is provided with a flange 189 through which a bolt 190 extends for connecting the flange to a guide chute 191. A door 192 is disposed across the lower end of the nozzle and is secured to an arm 193 which is pivotally mounted on a pivot pin 194. A fluid pressure cylinder 196 has a piston rod 197 connected to a lever 198 which is also secured to the pivot pin 194. Thus, actuation of the fluid cylinder 196 causes opening and closing of the door 192 to discharge sand to a suitable receptacle.

The dust collectors 99 and 108 may be of any suitable commercial form. The collectors herein shown are of the cyclone type.

The air heating unit 102 may be identical to the air heater unit 54 disclosed in connection with Figure 1. However, of course, the heating unit 102 has an opening equipped with a flange connection 200 to the conduit 106 of the dust collector 108.

It will thus be apparent that the apparatus of the present invention comprises a processing tower such as indicated at 90 in Figure 5, having an inlet 118 for delivering a quantity of granular material to the interior of the tower. Heated gas is introduced into the tower by means of a gas discharge pipe 148 extending generally vertically in the processing tower and having an open end adjacent the lower end of the processing tower. The discharge pipe has alternate inwardly and outwardly sloping wall portions 150 and 151, the exterior surfaces of which define segmental conical baffle surfaces along the length of the discharge pipe for baffling the granular material as it tends to rise with the gaseous stream in the processing tower. A material cooler such as illustrated in Figure 6 is disposed in the vicinity of the tower and means is provided such as bucket loader 93 for delivering material from the lower end of the tower to the upper end of the cooler. A furnace such as 102 adjacent the tower is connected with the discharge pipe 148 as by means of inlet pipe 145 for delivering heated gas to the tower while blower means such as 96 is provided for directing air through a conduit 97 to the cooler, and from the cooler through further conduits 98 and 100 to the furnace 102. The air is thus preheated in the cooler 94, further heated in the furnace 102 and then discharged through the pipe 148 into the reclamation tower 90. The processing tower is provided with cooperating baffle means such as 124 alternating with the discharge pipe baffles provided by wall portions 150 and 151 so that gas discharged from the discharge pipe follows a zig-zag passage through the processing towers.

The operation of the reclamation unit of this invention has been described as working on a batch principle. It is to be noted that it is adapted to be controlled by a program timer so that the various functions are repeated indefinitely.

It will be understood that modifications and variations may be effected without departing from the scope of the novel concepts of the present invention.

I claim as my invention:

Apparatus for reclaiming granular material, comprising a processing tower having an inlet opening into said tower adjacent the top thereof for delivering a quantity of material to said tower, a gas discharge pipe extending generally vertically in said processing tower and having an open end adjacent the lower end of said processing tower, said discharge pipe having alternate inwardly and outwardly sloping wall portions, the external surfaces of said wall portions defining segmental conical baffle surfaces along the length of said discharge pipe, a gas inlet pipe extending into said processing tower and connecting with said discharge pipe for delivery of gas to said processing tower through the lower open end of said discharge pipe, a material cooler disposed in the vicinity of said tower, means for delivering material from the lower end of said tower to the upper end of said cooler, a furnace adjacent said tower and connected with said gas inlet pipe for delivering heated gas to said tower, a first conduit connected at one end with the upper portion of said cooler and at the other end with said furnace, a second conduit opening into said cooler, and blower means connected with said second conduit for forcing gas through said second conduit into said cooler and through said first conduit to said furnace for delivering gas to said tower through said discharge pipe, said processing tower having cooperating baffle means alternating with the discharge pipe baffle surfaces to define a zigzag passage through said processing tower for gas discharge from said discharge pipe at the lower end thereof.

(References on following page)

References Cited in the file of this patent

UNITED STATES PATENTS

| Number | Name | Date |
|---|---|---|
| 248,912 | Campbell | Nov. 1, 1881 |
| 275,272 | Rice | Apr. 3, 1883 |
| 290,115 | Russell | Dec. 11, 1883 |
| 512,673 | Mason | Jan. 9, 1894 |
| 669,411 | Guiterman | Mar. 5, 1901 |
| 685,336 | Leroy et al. | Oct. 29, 1901 |
| 1,812,397 | Freeman | June 30, 1931 |
| 2,028,416 | Silsby | Jan. 21, 1936 |
| 2,086,201 | Zeisberg | July 6, 1937 |
| 2,194,454 | Greenawalt | Mar. 19, 1940 |
| 2,206,973 | Payne | July 9, 1940 |
| 2,226,578 | Payne | Dec. 31, 1940 |
| 2,409,707 | Roetheli | Oct. 22, 1946 |
| 2,412,057 | Nichols | Dec. 3, 1946 |
| 2,429,667 | Christensen | Oct. 28, 1947 |
| 2,433,738 | Christensen | Dec. 30, 1947 |
| 2,440,620 | Taff | Apr. 27, 1948 |
| 2,444,990 | Hemminger | July 13, 1948 |
| 2,456,769 | Christensen | Dec. 21, 1948 |
| 2,480,748 | Luce | Aug. 30, 1949 |
| 2,503,788 | White | Apr. 11, 1950 |
| 2,533,142 | Royster | Dec. 5, 1950 |
| 2,579,678 | Kuhn | Dec. 25, 1951 |

OTHER REFERENCES

Fluo Solids for Roasting by Counselman. Article in Eng. and Mining Jour., vol. 151, No. 3, pages 84 and 85.